US008734290B2

(12) United States Patent
Fuller

(10) Patent No.: US 8,734,290 B2
(45) Date of Patent: May 27, 2014

(54) CONTROL SYSTEM FOR A VEHICLE DRIVETRAIN

(75) Inventor: John William Edward Fuller, Leyland (GB)

(73) Assignee: Torotrak (Development) Limited, Lancashire (GB)

( * ) Notice: Subject to any disclaimer, the term of this patent is extended or adjusted under 35 U.S.C. 154(b) by 37 days.

(21) Appl. No.: 13/513,536

(22) PCT Filed: Dec. 2, 2010

(86) PCT No.: PCT/GB2010/052013
§ 371 (c)(1),
(2), (4) Date: Aug. 13, 2012

(87) PCT Pub. No.: WO2011/067602
PCT Pub. Date: Jun. 9, 2011

(65) Prior Publication Data
US 2012/0302401 A1    Nov. 29, 2012

(30) Foreign Application Priority Data
Dec. 2, 2009 (GB) .................................. 0921118.6

(51) Int. Cl.
*B60K 31/00* (2006.01)
(52) U.S. Cl.
USPC ........................................................... 477/43
(58) Field of Classification Search
None
See application file for complete search history.

(56) References Cited

U.S. PATENT DOCUMENTS 3,202,012 A    8/1965    Jania ............................... 477/38
4,653,005 A *  3/1987    Osanai et al. ................... 701/62
(Continued)

FOREIGN PATENT DOCUMENTS

EP    0894210    2/1999
EP    1071891    1/2001
(Continued)

OTHER PUBLICATIONS

International Search Report and Written Opinion issued in PCT/GB2010/052013, mailed Aug. 21, 2013.

(Continued)

*Primary Examiner* — Dirk Wright
(74) *Attorney, Agent, or Firm* — Fulbright & Jaworski LLP

(57) ABSTRACT

The invention concerns an arrangement for controlling a vehicle drivetrain having an engine provided with a speed governor and a continuously variable transmission ("CVT") incorporating a variator which is constructed and arranged to regulate its reaction torque. The control system comprises a control part (504) movable by the driver to provide a driver input, an open loop subsystem (511) for operatively coupling the control part to the governor (520) to control no-load speed of the governor in dependence on the driver input, a closed loop subsystem comprising a comparator (502) which receives a first control signal deprived from the driver input and corresponding to a target engine speed, and a second control signal corresponding to engine speed, and which adjusts variator reaction torque in dependence upon a comparison of the first and second control signals causing the transmission to load the engine suitably to achieve the target engine speed.

20 Claims, 13 Drawing Sheets

(56) References Cited

U.S. PATENT DOCUMENTS

| | | | | |
|---|---|---|---|---|
| 5,575,737 | A * | 11/1996 | Weiss | 477/43 |
| 6,217,477 | B1 * | 4/2001 | Nobumoto et al. | 477/43 |
| 6,393,349 | B1 * | 5/2002 | Yasuoka | 701/54 |
| 6,482,122 | B2 * | 11/2002 | Ochiai et al. | 477/42 |
| 6,546,329 | B2 * | 4/2003 | Bellinger | 701/115 |
| 6,866,610 | B2 * | 3/2005 | Ito | 477/43 |
| 6,957,139 | B2 * | 10/2005 | Bellinger | 701/104 |
| 7,678,015 | B2 * | 3/2010 | Funke et al. | 477/43 |
| 8,088,036 | B2 * | 1/2012 | Fuchs et al. | 477/37 |
| 2006/0014608 | A1 * | 1/2006 | Mitchell et al. | 477/107 |

FOREIGN PATENT DOCUMENTS

| | | |
|---|---|---|
| GB | 781784 | 8/1957 |
| GB | 2410302 | 7/2005 |
| WO | WO 94/16244 | 7/1994 |
| WO | WO 2004/085190 | 10/2004 |

OTHER PUBLICATIONS

International Preliminary Report on Patentability issued in PCT/GB2010/052013, mailed Sep. 19, 2013.

* cited by examiner

CONTROL SYSTEM FOR A VEHICLE DRIVETRAIN

CROSS-REFERENCE TO RELATED APPLICATIONS

This application is a national phase application under 35 U.S.C. §371 of International Application No. PCT/GB2010/052013, filed Dec. 2, 2010, which claims priority Great Britain Application No. 0921118.6, filed Dec. 2, 2009. The entire text of each of the above-referenced applications is specifically incorporated by reference without disclaimer.

The present invention concerns an arrangement for controlling a vehicle engine and an associated continuously variable transmission ("CVT").

Vehicle transmissions which provide continuous (stepless) variation of drive ratio (the ratio of the engine speed to the speed of the driven vehicle wheels) are in themselves well known. One advantage of CVTs is that they have the potential to provide high fuel efficiency, as compared with conventional stepped ratio gearboxes, by enabling the engine to be run for more of the time in a condition which minimises its fuel usage for a given power. FIG. 1 is an isometric map for a diesel engine. Engine power is equal to engine speed (on the horizontal axis) multiplied by engine torque (vertical axis). Dotted lines 10 are lines of constant power. It will be observed that a given engine power can be achieved at a whole range of engine speeds. However there is in this example only one point for any given power level at which that power is developed using the least possible fuel. The relevant points on each constant power line are shown in FIG. 1 by circles 12. If all the points of minimum fuel consumption are joined together they form the optimum control line 14. Operating the engine along this line provides optimal fuel economy under all conditions. Doing so is only possible if the transmission ratio can be adjusted to allow the engine to run at the required speed given the rotational speed of the driven wheels (i.e. given the current vehicle speed), and a CVT is capable of doing this if suitably controlled.

CVTs typically have sophisticated electronic control systems based on suitably programmed microprocessors to control both engine and transmission in a coordinated manner to enable the engine to be operated at high efficiency. An example is provided in International patent application PCT/EP2004/003293, published as WO 2004/085190 in the name Torotrak (Development) Ltd. However there is a recognised practical and commercial need for a control system which can be implemented without microprocessor control, e.g. using a mechanical or hydro-mechanical arrangement. Off highway vehicles including agricultural and construction vehicles are one market sector in which this is considered desirable for the sake of robustness and/or ease of servicing, and in some cases for the sake of economy.

Such vehicles often use an engine with a governor (which may be a mechanical or electronic device) to regulate engine speed. Speed governed engines are often diesels.

In order to illustrate the challenges involved in creating a suitable control system some characteristics of a known type of CVT will be explained with reference to FIGS. 2, 3 and 4, all of which include a variator 20, which will be described first. FIGS. 2 and 3 are highly simplified and are intended merely to illustrate the variator's principle of operation. Greater constructional detail can be found in previous publications by the applicant including for example published European patent applications EP 0894210 and EP 1071891 (Torotrak (Development) Ltd).

A variator is a device having:—
- a rotary variator input, formed in the illustrated example as a variator shaft
- a rotary variator output, formed in the example as an output gear 24 provided e.g. with a chain or gear train (not shown) for coupling to another part of the transmission; and
- a mechanism for transferring drive between the variator input and output at a continuously variable ratio of input speed to output speed.

In the illustrated example the mechanism comprises a set of semi-toroidally recessed races 26, 28, 30, 32 which are mounted about and concentrically with the variator shaft 22. Input race 26 and output race 28 together define a first toroidal cavity 36. Input race 32 and output race 30 together define a second toroidal cavity 38. Input races 26 and 32 are mounted on the variator shaft 22 and rotate along with it. Output races 28, 30 are journalled on the variator shaft 22 and so able to rotate about it, but are both coupled to the output gear 24.

A first set of rollers 40 a,b,c (only one of which is shown in FIG. 2, for simplicity) is provided in the first toroidal cavity 36. A second set of rollers 42 a,b,c is provided in the second toroidal cavity 38. Each of the rollers 40, 42 runs on the semi-toroidally recessed faces of its associated input and output races and so serves to transfer drive from one race to the other. A film of "traction fluid" is maintained between rollers and races to minimise wear at the interface and drive is transmitted by virtue of shear in this film. The races are biased toward each other, typically by means of a hydraulic actuator (not shown) to provide the pressure at the interface needed to enable this transfer of drive.

Each roller 40, 42 is mounted in a manner which permits it three degrees of freedom: (1) it is able to rotate about its own axis, when driven by the races; (2) it is able to move back and forth along a circumferential path about the variator shaft 22; and (3) it is able to tilt about a tilt axis 45 non-parallel to both the roller axis and the variator axis, changing the roller's inclination. This is achieved in the illustrated variator by journaling each roller in a respective carriage 44 coupled through a piston rod 46 to a piston 48. The piston 48 is housed in a cylinder 49 to form a hydraulic actuator for applying a controlled biasing force to the roller with a component along its circumferential direction of travel.

Note that the tilt axis 45 is not perpendicular to the variator shaft 22, but is inclined to the perpendicular by a castor angle CA. The roller is subject to a steering effect by the races upon which it runs, tending to ensure that the motion of the roller and the adjacent race is parallel at their interface. This is equivalent to saying that the steering effect tends to maintain the roller's axis in intersection with the axis of the variator shall 22. By virtue of the castor angle CA, tilting of the rollers can restore this intersection following movement of the roller along its circumferential path. As a result, there is a relationship between the roller's circumferential position and its inclination. As the roller moves back and forth, it also tilts (turns about the tilt axis 45). The rollers move in unison to vary variator drive ratio. As the inclination of the rollers changes, the radius of the path they trace upon one race decreases, while the radius of the path traced on the other increases, thereby changing the relative speeds of the two races and hence changing the drive ratio.

Consider now the torques acting about the variator shaft 22. Suppose that an engine drives the variator shaft 22 and hence the input races 26, 32, applying to them an input torque Tin. The rollers are driven by the input races 26, 32 and in turn drive the output races 28, 30, applying to them an output torque Tout. Each roller is urged along a circumferential path about the variator shaft 22 by the effect of the races, and the effect on the roller—which is a force F acting at a fixed distance r from the shaft's axis—can be expressed as a torque. To keep the rollers in position, the torque F×r acting on each must be reacted to the variator casing. The sum of the torques acting on all of the rollers 13 is the total torque that must be reacted through the variator's mountings to keep it from spinning and is referred to as "the reaction torque". Note also that the reaction torque is the sum of the variator's input and output torques:

$$Tin + Tout = \text{reaction torque} = F \times r \times \text{number of rollers}$$

Reaction torque is thus proportional to the force F. In the illustrated variator the force F acting on each roller is reacted to the casing through the corresponding hydraulic actuator 48, 49, and so is equal to the force exerted by the actuator. Hence by controlling the actuator force, reaction torque is directly set.

In the illustrated example, using hydraulic actuators 48, 49, each actuator receives first and second hydraulic pressures which act on opposite sides of the piston 48, and the difference between the first and second hydraulic pressures determines the variator's reaction torque.

It is usual to assume that a transmission will be set to provide a certain drive ratio and will adjust itself accordingly, a mode of operation which may be referred to as "ratio control". An alternative, exemplified by the variator of FIG. 2, is to set the transmission (specifically the variator) to provide a regulated torque an approach referred to as "torque control".

If regulated control pressures are applied to the illustrated variator 20, it will regulate torque (specifically, reaction torque) and automatically adjust itself to accommodate consequent changes of drive ratio. FIG. 4 is intended to illustrate the principle. The variator 20 is illustrated in highly schematic form, only a single pair of input and output races 26, 28 and a single roller 40 being shown. The variator's input is coupled through gearing to an engine, and in the drawing gearing and engine are represented simply by a box 50, which possesses a moment of inertia Je (contributed by the engine, the gearing and by parts of the variator itself). The engine exerts an engine torque Te on this inertia. The variator's output is coupled through gearing to an output shaft and so to the driven vehicle wheels. Box 52 represents the vehicle moment of inertia Jv referred to the variator output (due to inertias of the gearing, of parts of the variator, and of the vehicle itself). All the other factors (other than transmission output torque) acting on the vehicle, such as air resistance, friction, gravity (of the vehicle is climbing or descending an incline) etc result in a torque Tv on the vehicle inertia Jv. Recall that the reaction torque Tin+Tout is regulated by the variator. The ratio Tin/Tout is determined by the current variator ratio. Hence the values of Tin and Tout are (neglecting inefficiencies in the variator) determined by the variator reaction torque and the current variator ratio. At the variator output, a net torque Tout-Tv is available to accelerate the output inertia Jv. If this net torque is non-zero then the output speed will change. That is, the vehicle will accelerate or decelerate. The variator automatically accommodates this change by virtue of a change in its drive ratio (due to tilting of the rollers), and the change of output speed and variator ratio continues until an equilibrium is reached at which Tout is equal to Tv. In principle the same applies mutatis mutandis to the input side of the variator: any imbalance between engine torque Te and the torque Tin created by the variator at its input would result in a change in variator input speed tending to restore equilibrium. However in the case of speed governed diesel engines, which automatically adjust their output torque to maintain a chosen engine speed, the engine itself may adjust its torque Te to achieve substantially constant speed at the variator input.

Torque control of the variator and transmission has important advantages. For example a torque controlled transmission will automatically downshift upon encountering an increase in load whilst still maintaining tractive effort at the driven vehicle wheels. This is desirable for operations such as front loading (e.g. where the scoop of a digger is driven into material to collect it, creating an abrupt increase in load).

The challenges involved in creating a non-microprocessor based control system for the engine and transmission include the following:

a. the relationship between variator differential pressure and the torque at the variator input or output varies with variator ratio;

b. the available engine torque varies with engine speed. As will be discussed below, it is important that the control system can fully load the engine to achieve high fuel efficiency. The maximum variator reaction pressure must therefore be modulated as a function of engine speed.

c. agricultural and construction vehicles often have auxiliary or external systems (e.g. hydraulic pumps to power external services) creating loads which vary between different types of operation and also in duty during an operation;

d. when operating the engine at or near full torque, there is the risk of overloading the engine and causing it to stall, e.g. due to loads applied by auxiliary systems;

e. as noted above, it is desirable to fully load the engine to achieve high efficiency—that is, to run the engine at its maximum level of torque for much of the time. However, if the engine is running at maximum torque then managing engine speed becomes problematic, since one cannot increase engine torque further when an increase of engine speed is required. A coordinated approach to control of the engine and the transmission is thus required.

f. A simple 'open loop' control system, where input torque is controlled as a function of engine speed, is liable to be inaccurate and to be affected by tolerances of many types. Also unpredictable auxiliary loads make this approach unfeasible The present invention is intended to provide a simple means of regulating the operation of a speed governed engine and an associated torque controlled transmission to achieve good fuel efficiency.

According to a first aspect of the present invention there is a control system for a vehicle drivetrain having an engine provided with a speed governor and a continuously variable transmission incorporating a variator which is constructed and arranged to regulate variator reaction torque, the control system comprising a control part movable by the driver to provide a driver input.

an open loop subsystem for operatively coupling the control part to the governor to control no-load speed of the governor in dependence on the driver input, a closed loop subsystem comprising a comparator which receives a first control signal derived from the driver input and corresponding to a target engine speed, and a second control signal corresponding to engine speed, and which adjusts variator reaction torque in dependence upon a comparison of the first and second control signals causing the transmission to load the engine suitably to achieve the target engine speed.

Drivers are accustomed to controlling the vehicle engine through an accelerator pedal, and the control part preferably takes the form of a pedal although it could instead be a hand operated part such as a lever.

It is particularly preferred that the target engine speed is smaller than the no-load speed. Still more preferably the target engine speed is, for driver inputs above a predetermined threshold, smaller than the no-load engine speed by a margin in the range from 2 to 10 percent of the no-load engine speed. The effect is that, at least while power is being transmitted from the engine to the wheels, the governor loads the engine to a level at or close to its maximum torque and so keeps it operating at high efficiency.

It is particularly preferred that the open loop subsystem comprises a physical coupling between the control part and the governor. This coupling may be mechanical or hydraulic. Electronics can thus be dispensed with in this context. A cable or pushrod linkage may for example be used, although an alternative would be a hydraulic system with a master cylinder containing a piston moved by the control part and a slave cylinder controlling the governor.

It is particularly preferred that the comparator is a mechanical device. "Mechanical" is to be understood here and elsewhere to exclude electronic devices but to include any suitable form of physical mechanism including for example hydraulic devices. It is particularly preferred that the comparator takes the form of a valve arranged to control the variator by modulating a hydraulic pressure applied to it.

Preferably the first control signal takes the form of a force applied to the comparator, the system comprising a converter mechanism for converting the position of the control part into the said force. In one such embodiment the said mechanism comprises a spring through which the control part is coupled to the comparator. Additionally or alternatively the converter mechanism may comprise a hydraulic valve whose output pressure is modulated in accordance with position of the control part.

Preferably the second control signal also takes the form of a force applied to the comparator, the system comprising a modulation device for modulating the said force in accordance with engine speed. In one such embodiment the modulation device comprises a solenoid whose electrical supply is modulated in dependence on engine speed. In another such embodiment the modulation device comprises a pump operated by the engine, and an arrangement for modulating a hydraulic pressure in accordance with pump flow. The said arrangement may for example comprise a restrictor in the flow of fluid from the pump.

The first and second control signals preferably work in opposition on a movable part of the comparator mechanism.

It is particularly preferred that the comparator comprises a valve serving to modulate a variator control pressure. The valve preferably has a movable part such as its spool or sleeve which is subject to the first and second control signals, working in opposition. Preferably the valve serves, depending on which of the first and second control signals dominates, to connect the variator either to an exhaust or to a source of pressurised hydraulic fluid.

According to a second aspect of the present invention there is a control system for a vehicle drivetrain having an engine provided with a speed governor and a continuously variable transmission incorporating a variator which is constructed and arranged to regulate variator reaction torque, the control system comprising
  a control part movable by the driver to provide a driver input,
  an open loop subsystem for operatively coupling the control part to the governor to control no-load speed of the governor in dependence on the driver input,
  a closed loop subsystem comprising a comparator which receives a first control signal derived from the driver input and corresponding to a target engine speed, and a second control signal corresponding to engine speed, and which adjusts variator reaction torque in dependence upon a comparison of the first and second control signals causing the transmission to load the engine suitably to achieve the target engine speed.

Specific embodiments of the present invention will now be described, by way of example only, with reference to the accompanying drawings, in which:—

Figure 1:
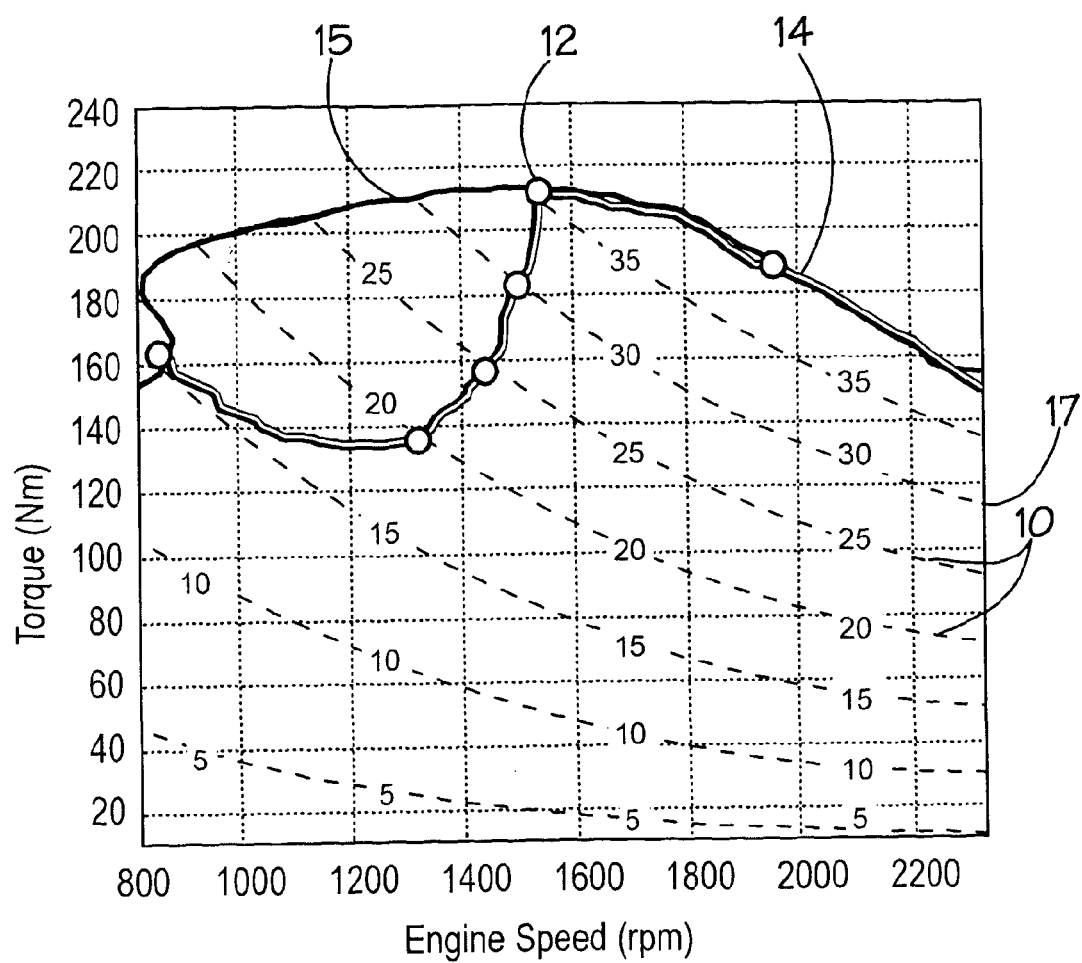
FIG. 1 is a graph having engine speed on the horizontal axis and engine torque on the vertical axis on which are indicated lines of constant engine power, and also an optimum control line for a particular diesel engine.

Looking again at FIG. 1, the form of the optimum control line 14 is complex. Devising a non-electronic system to operate along this line would be challenging. However it will be observed that at engine speeds above about 1500 rpm the optimum control line largely coincides with a line 15 representing the maximum torque that the engine can provide. Embodiments of the invention to be described below are intended to operate the engine at or close to the maximum torque line at all engine speeds. At speeds below 1500 rpm the detriment in terms of fuel consumption, due to departure from the optimum control line, is small. By way of illustration, consider the 30 kW contour 17. If the operating point were 1300 rpm (on the maximum torque line) rather than 1475 rpm (on the optimum control line) the specific fuel consumption turns out to be just 0.9% higher.

Engine governors typically receive a control input which determines the "no-load speed"—the speed at which the engine would run, under the control of the governor, if no load acted on it. Loading the engine slows it, and the governor detects the difference between the actual engine speed and the no-load engine speed and adjusts engine fuelling to reduce the difference. Hence engine fuelling is a function of the difference between the actual and the no-load engine speed. The governor has a characteristic curve which typically has a slope of 4% to 7%. That is to say, the governor will adjust the engine to give maximum fuelling, and hence maximum torque, if the actual speed is 4% to 7% less than the no-load speed. Hence loading the engine sufficiently to slow the engine by this margin ensures that the engine is operated at maximum torque. This can only be achieved while power flows from the engine to the driven vehicle wheels—when the vehicle is in overrun (engine braking) and power flows in the opposite direction, the transmission is (if one neglects inertial effects and friction) incapable of loading the engine.

The governor used in the present invention permits engine speed to vary somewhat with engine load, even if the engine is not operating at maximum torque. It may in principle be a mechanical device, or it could be electronic. Modern electronic controllers often use "PID"—proportional/integral/differential—logic. Note however that the governor used in the present embodiment has a proportional term—it controls engine fuelling as a function of the difference between the actual engine speed and the no load engine speed—but it has no integral term, where effect would be to match the actual engine speed to the no load engine speed over time.

Embodiments of the invention to be described below have:
(a) a driver control, such as a pedal, through which the driver provides a control input;
(b) an open loop subsystem for setting the governor's no-load speed based on the driver's control input; and
(c) a closed loop subsystem, based on engine speed, for adjusting the variator to load the engine to achieve a target engine speed. The closed loop subsystem has a comparator which receives a first control signal representing the target engine speed and a second control signal representing the actual engine speed, and serves to adjust variator reaction torque on the basis of this comparison.

In order to control the vehicle, the driver needs to control the torque at the driven vehicle wheels. Note however that (neglecting inertial effects and friction) the wheel torque is equal to the load (torque) on the engine, multiplied by the transmission ratio. The system just described regulates the engine load in a controllable manner, and so also regulates the wheel torque correspondingly.

Figure 2:
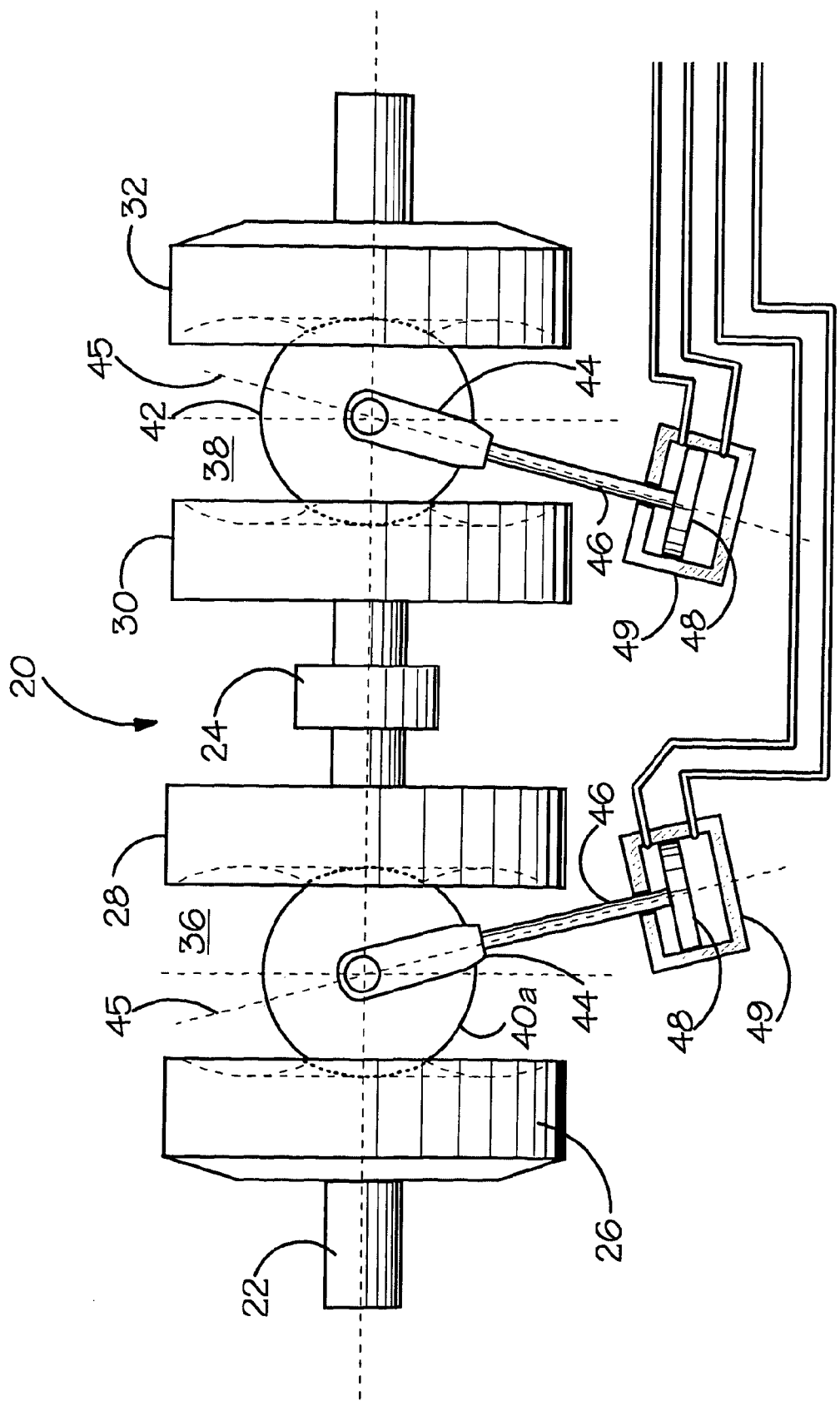
FIG. 2 is a simplified representation of a variator, viewed along a radial direction.
Figure 3:
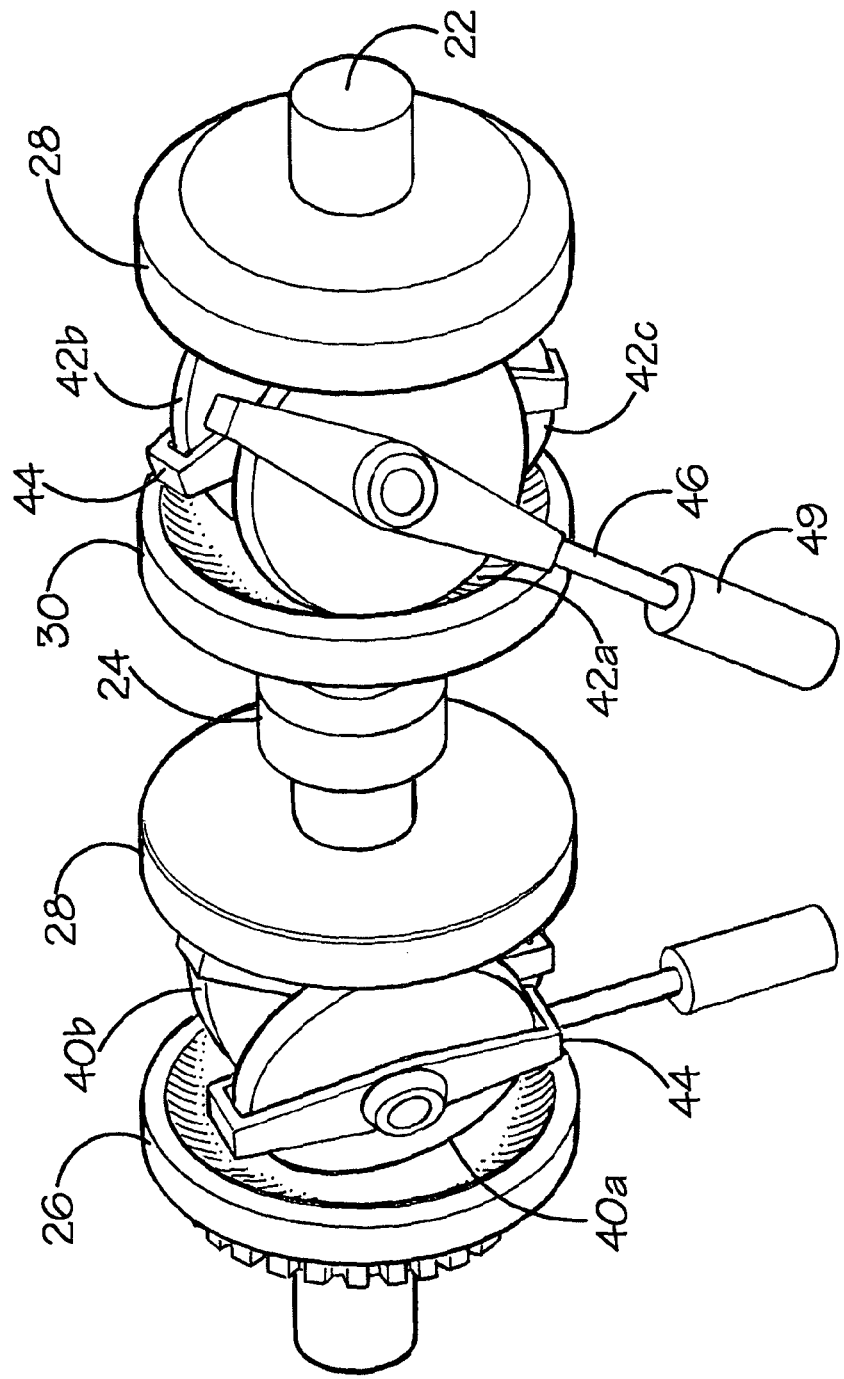
FIG. 3 is a simplified perspective view of the same variator.
Figure 4:
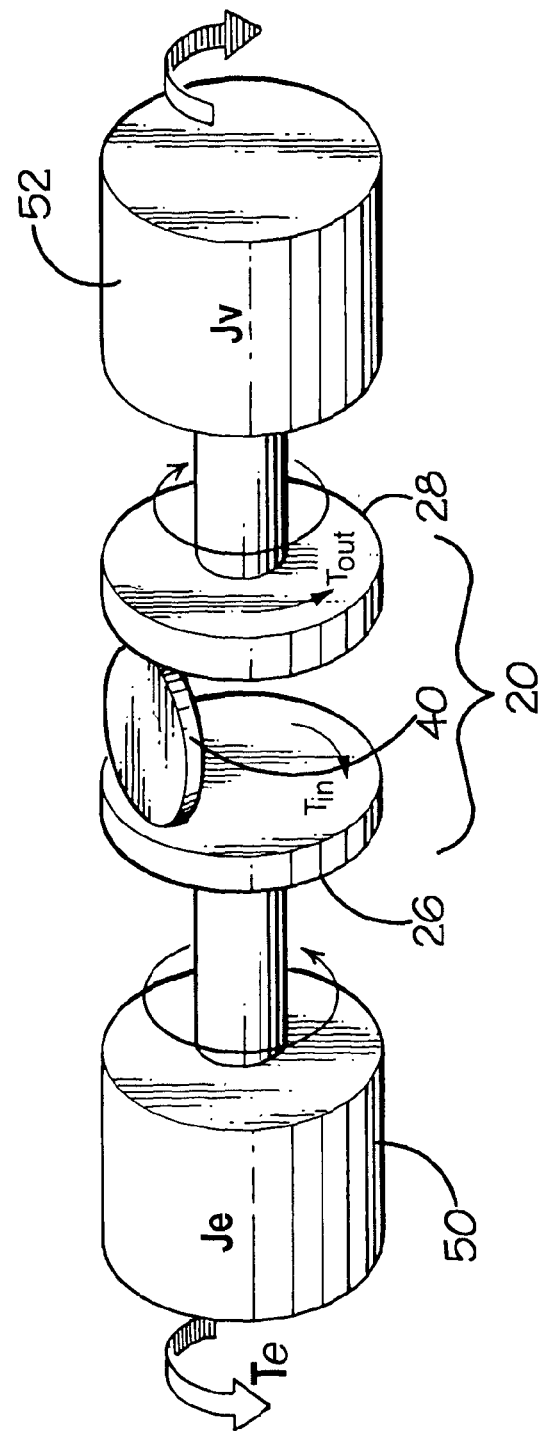
FIG. 4 is a highly schematic representation of a CVT incorporating a variator.
Figure 5:
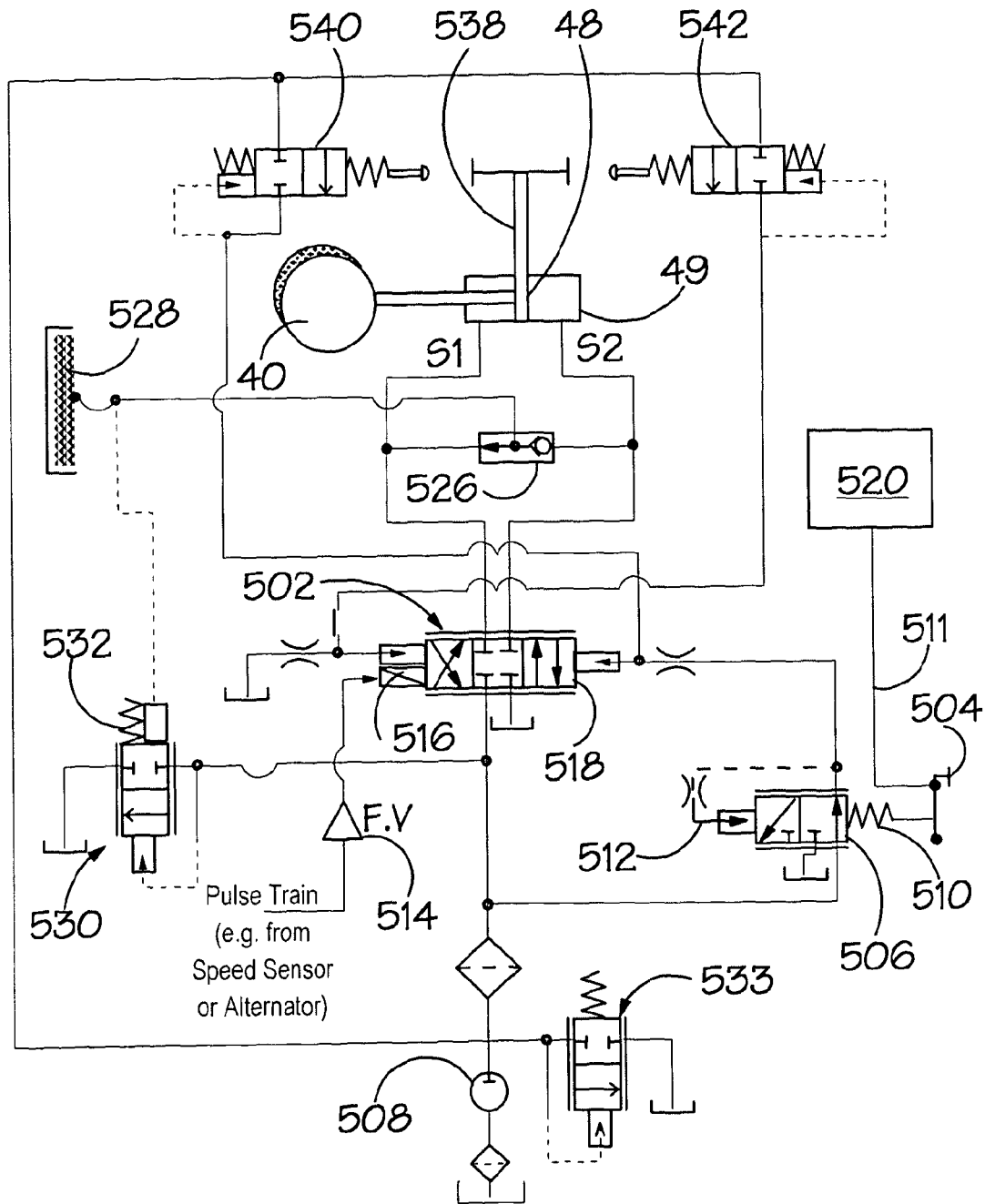
FIG. 5 is a schematic representation of a first powertrain control system embodying the present invention.

FIG. 5 illustrates an implementation of such a system schematically. The variator's rollers are here represented by a single roller 40 which, as in FIGS. 2 and 3, is subject to a controlled force by a piston 48 in a cylinder 49. The piston 48 is double acting—that is, it is subject to opposing hydraulic pressures on two sides and these hydraulic pressures are supplied through lines S1 and S2. The difference between the opposing pressures in lines S1 and S2 determines the force on the rollers and hence the variator's reaction torque, in the manner explained above. The driver control is in this embodiment formed as a pedal 504.

The closed loop subsystem will now be explained. It comprises a pressure control valve 502 which forms the aforementioned comparator and which receives first and second control signals corresponding respectively to the driver's control input and to the engine speed.

The pedal position determines the first control signal, which in this embodiment takes the form of a first control pressure, output from a demand valve 506. The first control pressure corresponds to (and more specifically is a monotonically increasing function of, or still more specifically is proportional to) the pedal position. There are many ways in which this may be implemented, but in the illustrated example the pedal is coupled to the demand valve's spool through a spring 510 so that a force proportional to pedal position is applied to the spool in one direction (to the left in the drawing). The output pressure of the demand valve 506 is fed back through a pilot passage 512 to the other end of the spool to apply a force which is proportional to output pressure in the opposite direction (to the right in the drawing). The valve adjusts its own output pressure to balance the two forces, causing the output pressure to vary with pedal position in the required manner.

The second control signal corresponds to (and more specifically is a monotonically increasing function of, or still more specifically is proportional to) the engine speed. This can be achieved in a number of ways but in the present embodiment the second control signal is provided by an electromechanical arrangement. A pulse train modulated according to engine speed (e.g. from an engine speed sensor) is converted to a voltage signal by circuitry 514. In the case of a pulse train from a speed sensor, this involves frequency to voltage conversion, which can be carried out by simple analogue circuitry. The voltage signal is applied to a solenoid 516. Another possible embodiment uses the output of the engine's alternator, applied to the solenoid 516, to form the second control signal.

The first and second control signals are compared by the pressure control valve 502, which modulates the pressures in lines S1 and S2, and hence the variator reaction torque, according to the outcome of the comparison. More specifically, the first control pressure acts in one direction on spool 518 of the pressure control valve 502. The solenoid 516 acts in the opposite direction on the spool 518. Dependent on which dominates, the pressure control valve 502 either (a) applies pump pressure to S1; (b) applies pump pressure to S2; or (c) if the two signals balance, isolates both S1 and S2 from the pump 508.

The first control signal corresponds to a target engine speed. If the engine speed exceeds the target, the second control signal dominates and the pressure control valve 502 applies pump pressure to S2 while exhausting S1, causing the variator to create increased reaction torque and hence a larger engine load, reducing the engine speed. If the engine speed falls below the target, the first control signal dominates and the pressure control valve 502 applies pump pressure to S1 while exhausting S2. Variator reaction torque, and engine load, are reduced, enabling the engine to accelerate.

As noted above, the open loop subsystem controls the no-load engine speed requirement applied to the engine governor. In the illustrated example this is achieved simply by means of a cable 511 or other mechanical coupling between the pedal 504 and a control input of the governor 520 so that the pedal position determines the engine no-load speed. No-load engine speed is a function of (and more specifically is a monotonically increasing function of, or still more specifically is proportional to) the pedal position.

The system is constructed and/or adjusted such that, at least so long as the driver control input implies a requirement for torque at the driven vehicle wheels, the target engine speed of the closed loop subsystem is lower than the no-load engine speed set by the open loop subsystem, so that the transmission loads the engine. Further, the difference between the target engine speed and the no-load engine speed is chosen to be of similar magnitude to the governor run-out (typically 4 to 7% of engine speed) in order to ensure that the engine is run at maximum torque whenever possible.

Some system operating scenarios will now be considered.

When the pedal is not depressed, no-load engine speed is set at low idle. No pressure is applied to the variator through S1 and S2 and no reaction torque is created.

Suppose now that the vehicle is moving in a steady state condition with a constant pedal position and positive torque at the driven vehicle wheels, the engine running on the maximum torque line (i.e. maximum fuelling, so that fuelling can be considered constant in this analysis). Suppose that an increased load is applied to the vehicle wheels as the vehicle encounters an upward incline. The engine, already operating at maximum torque, is unable to sustain its speed which thus begins to fall. The first control signal remains constant due to the constant pedal position. However the second control signal, representing engine speed, decreases with the engine speed. The pressure control valve 502 applies pressure to line S1 and exhausts line S2, reducing reaction torque and unloading the engine, thus allowing the engine to return to the target speed. Wheel torque is correspondingly reduced and the vehicle is likely to slow down. The variator automatically adjusts to the resultant change of its input and output speeds, reducing transmission ratio in accordance with the reduced vehicle speed. Despite the operation of the engine at maximum torque, such increases in load can thus be automatically accommodated without risk of stalling the engine by overloading it.

Consider now what happens when, starting from a steady state operating condition, the driver changes the control input by depressing the pedal 504, implying that more power is to be delivered to the vehicle wheels. The no-load speed setting of the governor 520 is increased and engine fuelling/torque correspondingly increases (unless the engine is already operating at maximum torque). The target engine speed will also increase, meaning that the engine speed is below the target value and the closed loop subsystem would, if the adjustment were made instantaneously, tend to reduce engine load. Engine speed can thus rapidly increase, which is desirable in order to provide increased engine power. However this unloading of the engine would result in a transient reduction in wheel torque, which is the opposite of what the driver expects when the pedal is depressed. In this situation excessive power would be used to accelerate the engine, leaving too little power to sustain wheel torque. The issue is well known in relation to other types of automatic transmission, where "kick down" in response to a sudden driver demand for power can initially cause a reduction in wheel torque/vehicle acceleration, rather than the increase that the driver requires.

In order to regulate such transient events the system of FIG. 5 incorporates an arrangement for controlling the rate of change of the first control signal. In the illustrated embodiment this takes the form of a restrictor 522 in the outlet from the demand valve 506. The restrictor limits the rate of flow that can be created by a given (upstream) pressure. In this embodiment the restrictor comprises a sharp-edged orifice in the relevant hydraulic line. The flow/pressure characteristic of a sharp edged orifice is largely invariant with fluid viscosity, so that the restrictor's flow/pressure characteristic is much the same whether the hydraulic fluid is hot or cold. These components together limit the rate of change of the first control signal.

The effect is to regulate the rate of change of engine speed. Hence even during transient events such as a rapid pedal depression, residual engine torque not used to accelerate the engine is available to generate torque at the driven vehicle wheels. The required "slew rate" can be established by examining the engine torque characteristic and selecting the maximum proportion of engine torque to be used in accelerating the engine. Referring back to FIG. 1, it will be observed that the available torque does not fall below 160 Nm at any point in the engine peed range. If it is decided to use at most 50% of this figure—80 Nm—for accelerating the engine, and assuming an engine/flywheel/variator input moment of inertia Je of 1 $kgm^2$, a maximum engine acceleration of about 760 rpm/s is obtained, meaning that maximum engine speed can be achieved from idle in just over two seconds, which is considered acceptable.

Other aspects of the FIG. 5 circuit will now be explained.

A higher-wins valve arrangement 526 is connected between the hydraulic lines S1 and S2 and serves to apply the higher of the S1/S2 line pressures to an "end load" actuator 528. This part is only schematically represented in the drawings and is well known in the art. The end load actuator serves to bias the variator races 26, 28, 30, 32 into engagement with the rollers 40, 42 (refer to FIGS. 2 and 3) to provide roller/race traction, and does so with a force which varies in sympathy with variator reaction torque.

A primary regulator valve 530 is used in this embodiment to regulate pressure from pump 508. The primary regulator valve compares the higher of the S1/S2 line pressures (output from the higher-wins valve arrangement 526) with the pressure at the pump output, weighting this comparison by virtue of a spring 532, and so maintains a pump output pressure which varies with, and is always greater than, the pressure needed to control the variator. Excessive pump pressure is exhausted. The arrangement is well suited to use with a displacement type pump, which could otherwise create excessive pressure and/or be inefficient. A limit on maximum pressure from the pump 508 is imposed by a relief valve 533.

The system of FIG. 5 incorporates hydraulic "end stops" to prevent the variator rollers 40, 42 moving too far in either direction (which could otherwise lead to malfunction, e.g. due to the rollers 40, 42 running off the races 26, 28, 30, 32). A lever 538 is coupled to and movable by the piston 48 and, if moved far enough in either direction, opens one of two end stop valves 540, 542, applying pump pressure to a corresponding end of the spool of the pressure control valve 502. The full pump pressure is thus applied to the piston 48 to prevent it moving beyond the end stop position.

Figure 6:
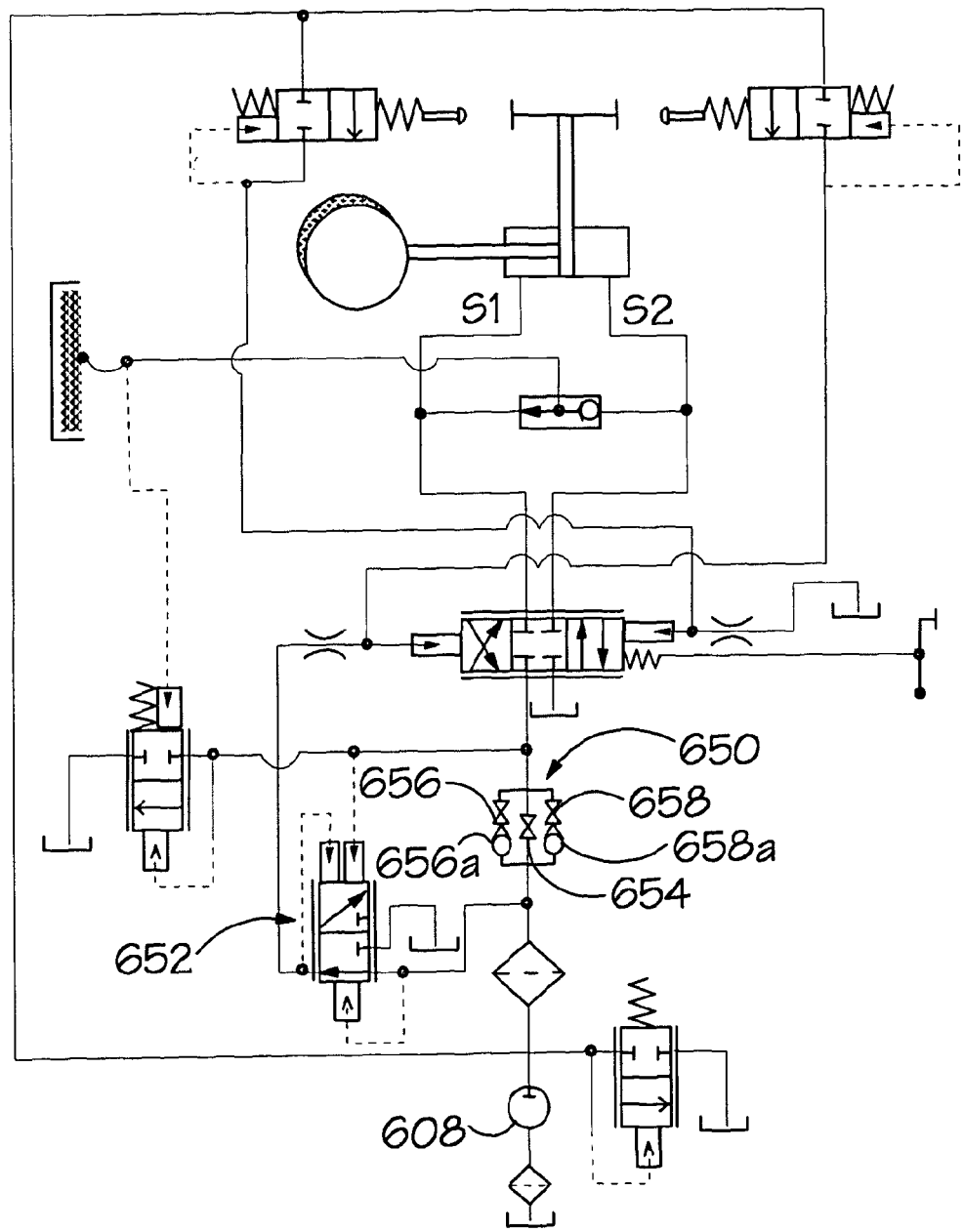
FIG. 6 is a schematic representation of a second power train control system embodying the present invention.

FIG. 6 represents a control system which is similar in many respects to that of FIG. 5. Elements of the two systems which are identical will not be described again. The difference between the two systems lies in the manner in which the second control signal, representing engine speed, is generated. Whereas this is generated by an electrical or electronic arrangement in the FIG. 5 system, that of FIG. 6 uses a hydraulic arrangement for the purpose, as will now be explained.

Pump 608 is driven from the vehicle engine (not shown) and provides a fluid flow which corresponds to (and (and more specifically is a monotonically increasing function of, or still more specifically is proportional to) the engine speed. The flow rate is converted into a pressure using a sensing arrangement 650 whose details will be considered below but which, in essence, receives flow from the pump and creates a pressure drop between its upstream and downstream sides which corresponds to (and more specifically is a monotonically increasing function of, or still more specifically is proportional to) the rate of flow. The pressure difference between the upstream and downstream sides of the sensing arrangement 650 thus represents engine speed. These two pressures could in principle be applied to opposite ends of the spool of the pressure control valve 502, but in the illustrated circuit, for the sake of constructional convenience, they are instead applied to opposed inputs of a feedback valve 652 whose output is equal to the said pressure difference, and thus forms the second control signal.

Figure 7:
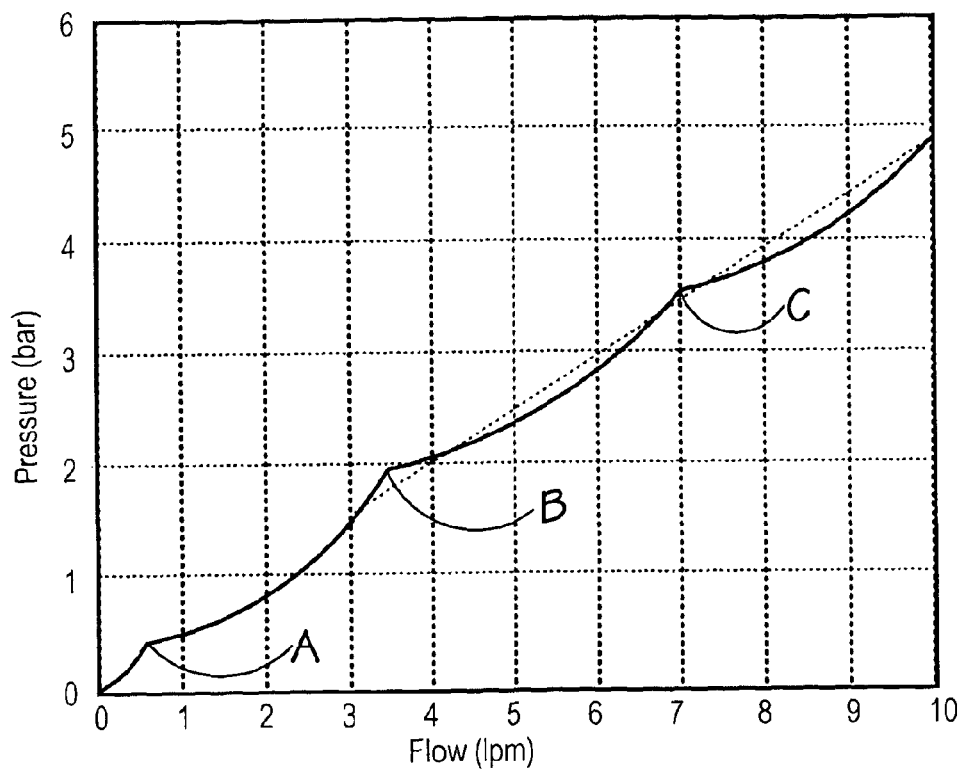
FIG. 7 is a graph of flow rate vs pressure drop in a restrictor arrangement found in the circuit of FIG. 6.

It is not vital that there should be a precisely linear relationship between engine speed and the hydraulic pressure forming the second control signal, but an approximation to a linear relationship is desirable. Also it is desirable that the relationship should not vary excessively with fluid viscosity, since viscosity can change dramatically as the system warms up. As explained above, a restriction in the form of a sharp-edged orifice is advantageous in that it produces much the same pressure drop for a given flow despite changes in viscosity. However the variation of pressure drop with flow rate in such a restriction is far from linear, pressure being closer to the square of the flow rate. One alternative would be to use a restriction intended to maintain laminar flow (an elongate narrow passage, for example) but while this produces a more linear pressure/flow characteristic, the pressure drop is found to vary dramatically with viscosity, and hence with temperature. The solution adopted in the FIG. 6 system is to use at least two differently sized orifices in parallel. The illustrated example has three orifices 654, 656, 658 each providing a route for through-flow. Orifice 654 is the smallest and is constantly open. Orifice 656 is larger and flow through it is possible only when an associated check valve 656a is subject to sufficient pressure to open. Orifice 658 is larger still and its associated check valve 658a opens at a higher pressure than valve 656a. The resultant pressure/flow characteristic is represented in FIG. 7. This was modelled using a system with four orifices, rather than the three orifices of FIG. 6. Points A, B and C correspond to the flow rates at which check valves open. A dotted line represents the ideal, linear characteristic and it can be seen that the real characteristic approximates to it.

Figure 8:
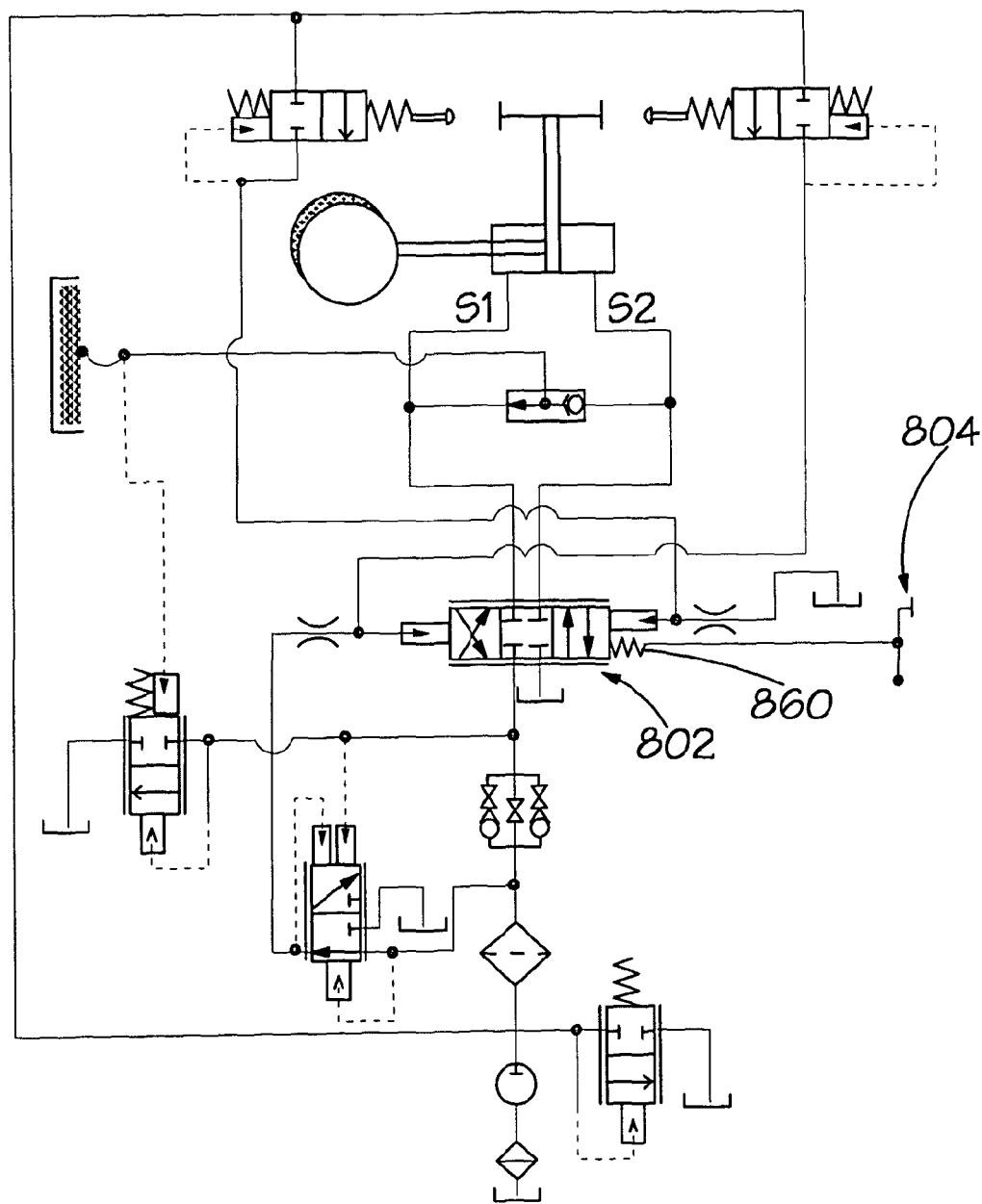
FIG. 8 is a schematic representation of a third powertrain control system embodying the present invention.

FIG. 8 represents a control system which is similar in many respects to that of FIG. 6. Elements of the two systems which are identical will not be described again. The difference between them lies in the manner in which the first control signal, representing the driver's demand, is generated. Demand valve 506 has been dispensed with and in its place is a mechanical coupling between the pedal 804 and the pressure control valve 802, so that a force representing pedal position is applied to the pressure control valve. In the illustrated example, a converter spring 860 between the pedal and the valve spool converts pedal position to a force which is the first control signal.

This is advantageous in that it reduces the valve count of the hydraulic circuit. However the demand valve 506 facilitated the regulation of transient, driver initiated events such as rapid pedal depression. The same manner of regulation is not possible in the FIG. 8 circuit. Alternative means are thus needed for regulating the response to such transient events.

One option would be to damp the response of the pressure control valve 802 so that its speed of reaction to changes in the first control signal is regulated. However if the valve response were highly damped under all conditions, the "drivability" of the vehicle could be impaired.

Figure 9:
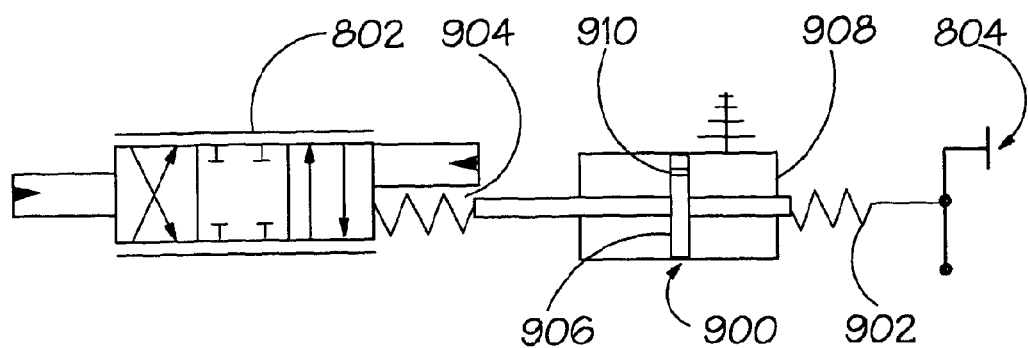
FIG. 9 illustrates a damper arrangement which can be incorporated in the control system of FIG. 8.

Another option is to damp changes in the force forming the first control signal. In FIG. 9 a hydraulic damper 900 is used for the purpose, the pedal 804 being coupled to one side of the damper through a converter spring 902 and the other side of the damper being coupled to the pressure control valve 802 through a coupling spring 904. The damper is schematically represented as a piston 906/cylinder 908 assembly with a restricted passage 910 for flow of fluid from one side of the piston to the other. Rapid movement of the pedal 804 produces a slower movement of the piston 906 and hence a regulated change in the first control signal.

Figure 10:
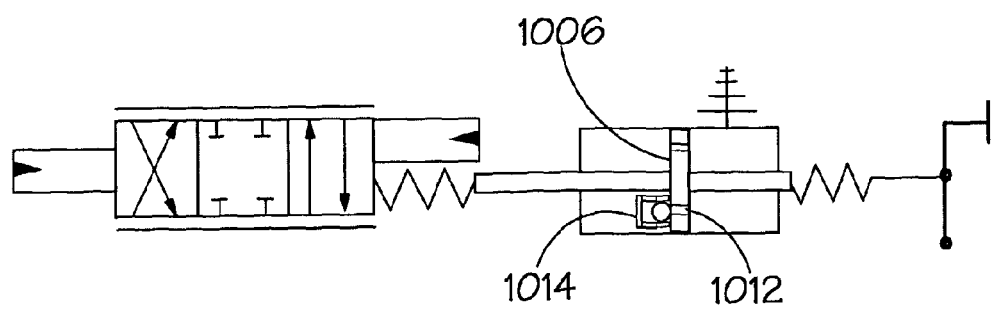
FIG. 10 illustrates a development of the damper arrangement of FIG. 9.

FIG. 10 represents a development of the FIG. 9 arrangement in which the damping rate is higher for pedal depression (representing a driver demand for increased power) then for pedal lift-off (representing a driver demand for reduced power). This has the effect of changing the transient variator reaction torque (and hence engine acceleration rate, and wheel torque) between drive and overrun conditions, which is desirable as engine overrun torque is considerably less than engine drive torque, particularly at low engine speeds. It also potentially improves drivability—the driver expects wheel torque to fall rapidly when he/she lifts off the pedal. Asymmetric damping is achieved in the illustrated example by providing a second passage 1012 for flow of fluid from one side of the damper piston 1006 to the other, the second passage being controlled by a one way valve 1014.

Figure 11:
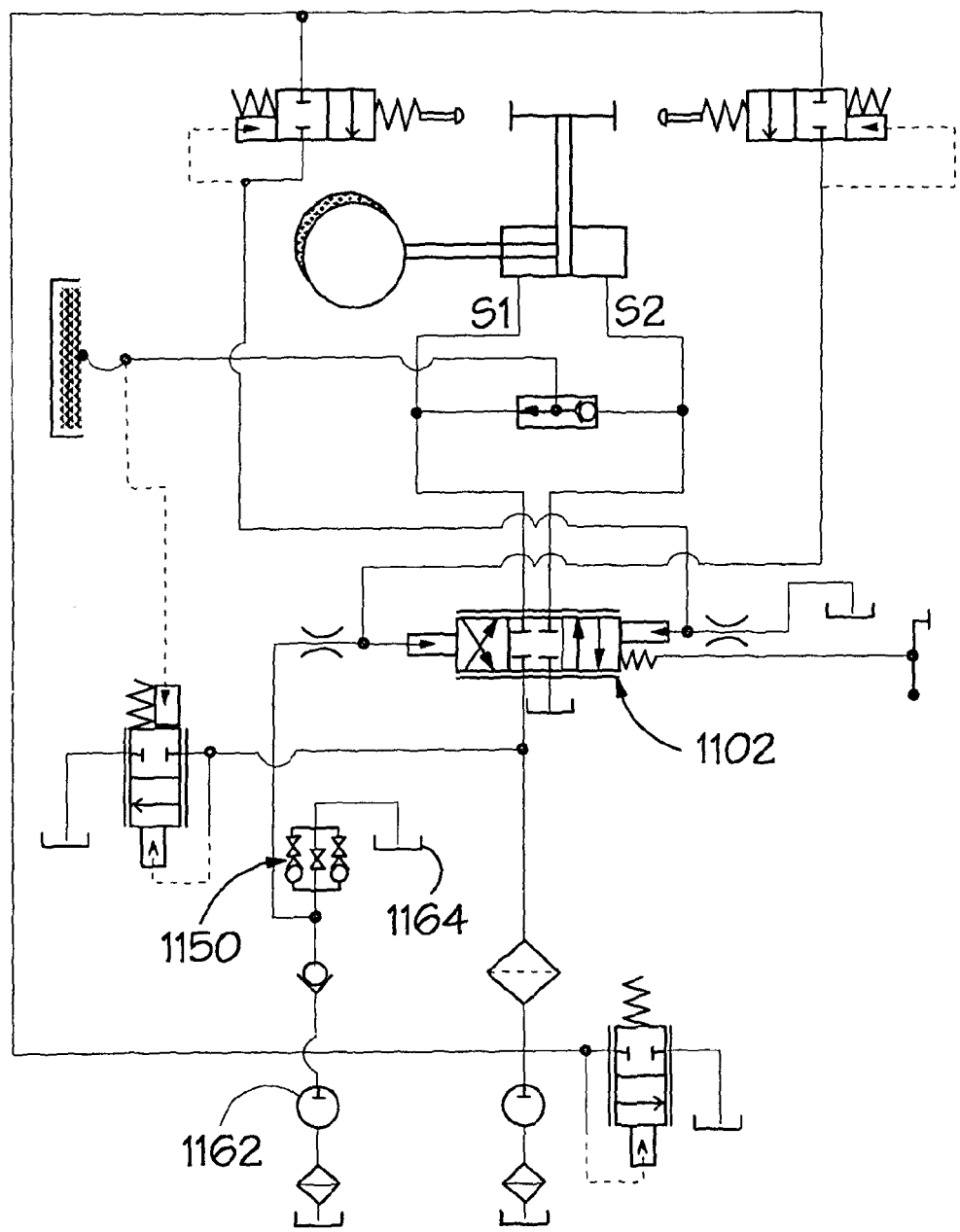
FIG. 11 is a schematic representation of a fourth powertrain control system embodying the present invention.

FIG. 11 represents a control system which is similar in many respects to that of FIG. 8. Elements of the systems which are identical will not be described again. The difference lies in the provision of a second pump—a feedback pump 1162—whose purpose is solely to provide a flow rate proportional to engine speed. This involves some additional constructional complexity but the feedback pump 1162 may be a low pressure device and could be placed in a common housing with the sensing arrangement 1150. Because the sensing arrangement 1150 exhausts to sump 1164 in this embodiment—i.e. its downstream side is at atmospheric pressure—it is not necessary to take account of this downstream pressure. The pressure upstream of the sensing assembly 1150 forms the second control signal and is applied directly to the pressure control valve 1102.

In another embodiment (not shown) the second control signal is provided by means of a hydraulic or mechanical governor. Hydraulic governors were commonplace on automatic gearboxes before the advent of electronic control rendered them redundant.

Figure 12:
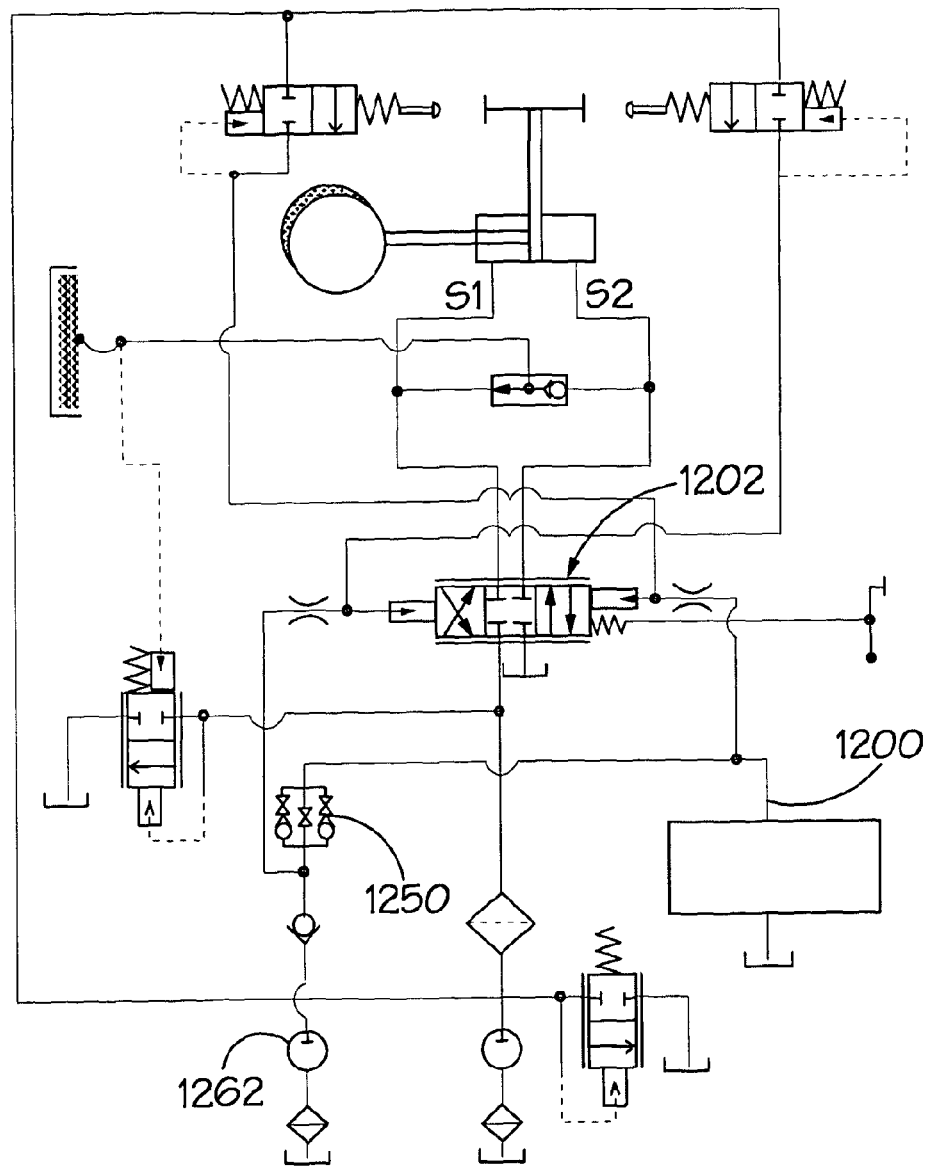
FIG. 12 is a schematic representation of a fifth powertrain control system embodying the present invention.

FIG. 12 represents a control system which is similar in many respects to that of FIG. 11. Elements of the systems which are identical will not be described again. Here, the second pump 1262 not only provides the second control signal but also provides a supply of lubrication fluid for the transmission through line 1200. Pressures upstream and downstream of the sensing arrangement 1250 are supplied to opposite sides of the pressure control valve 1202. Because the first control signal is applied mechanically, the pressure control valve need not have double pilot chambers.

Figure 13:
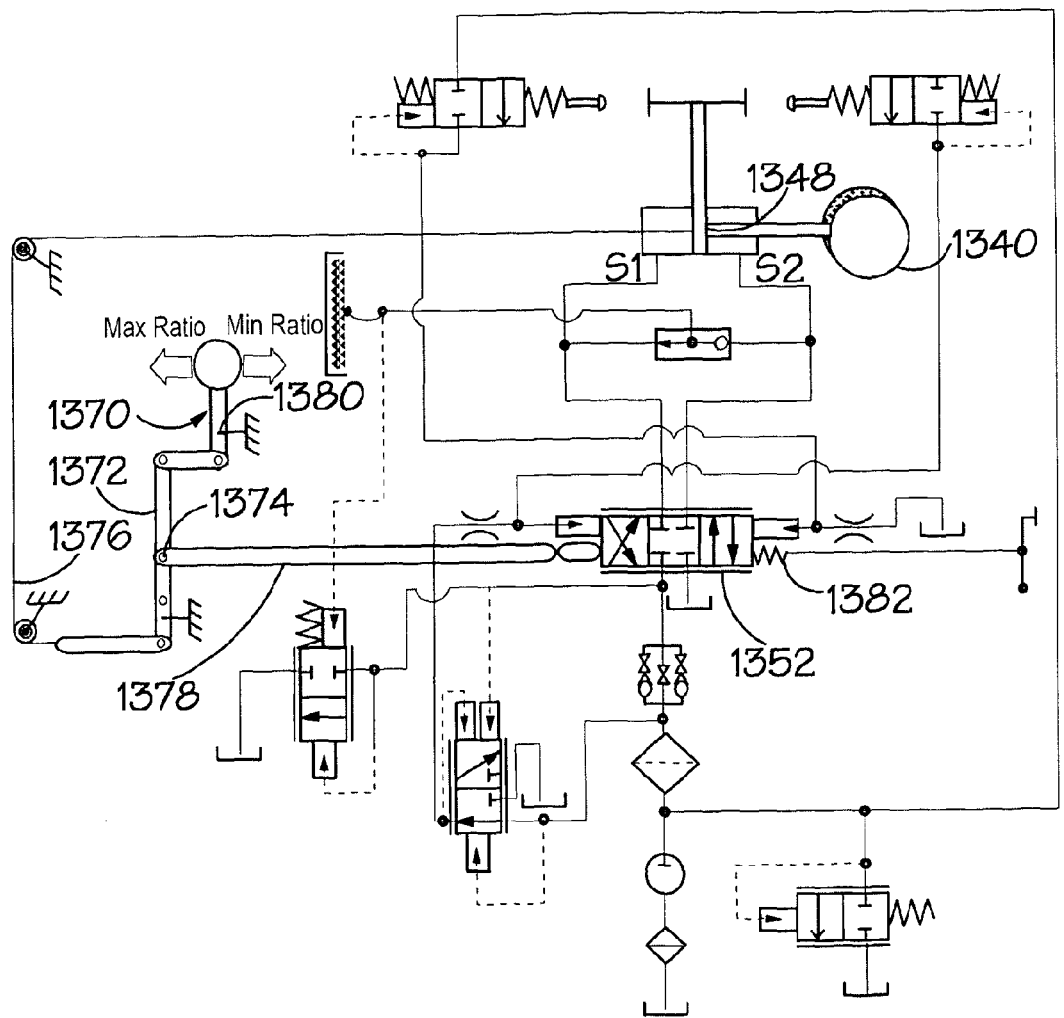
FIG. 13 is a schematic representation of a sixth power train control system embodying the present invention, which provides the driver with a choice between "torque control" and "ratio control"

FIG. 13 represents a control system which is in many respects similar to that of FIG. 8. Elements of the systems which are identical will not be described again. The FIG. 13 system offers the driver the facility to select (a) a "torque control" mode in which changes of transmission ratio are automatically managed by the system and (b) a "ratio control" mode in which the driver controls transmission ratio.

The torque control mode is provided using parts of the system already described. In ratio control mode the driver controls transmission ratio through a ratio control part formed in the embodiment as a ratio control lever 1370. A comparator mechanism compares (a) variator piston/roller position with (b) control lever position, and dictates the state of the pressure control valve 502 on the basis of this comparison. In the illustrated example the comparator is mechanical. It comprises a comparator bar 1372 pivotable about a movable fulcrum 1374. The control lever 1370 acts on the comparator bar 1372 on one side of the fulcrum. A feedback coupling 1376 to the variator piston 48 positions the comparator bar on the other side of the fulcrum. In the illustrated example the feedback coupling is a cable led to the piston 48, but other arrangements—hydraulic, mechanical or otherwise—could be adopted. The fulcrum is operatively coupled to the spool of the pressure control valve 1352. In the illustrated example this is through a pushrod 1378. To appreciate the operation of the mechanism, suppose that—from an initial equilibrium condition—the ratio control lever 1370 is moved to the left. Because the ratio control lever pivots about a fixed pivot 1380, it moves the upper end of the comparator bar 1372 rightward. The fulcrum 1374, pushrod 1378 and the spool of the pressure control valve 1352 are likewise moved rightward, causing the pressure control valve 1352 to apply pump pressure to line S2, urging the piston 1348 and the variator roller rightward. The resultant roller movement produces an increase in variator ratio and continues until the initial movement of the ratio control lever is cancelled out by the roller movement, allowing the pressure control valve to return to its central position.

The arrangement performs closed loop control on piston position, moving the piston to a position dictated by the ratio control lever. Since piston position dictates variator ratio, the effect is to adjust ratio to the value set by the driver using the ratio control lever 1370.

It is found that the linkages in this arrangement need to be preloaded to take up backlash which can otherwise impair control. When switching from torque to ratio control mode the pushrod 1378 needs to be applied to the spool of the pressure control valve 1352. The existing spring 1382 acting on the spool of the pressure control valve 1352 can be used for this purpose. An over centre mechanism (not shown) can be used both to engage the push rod 1378 and to pre-load the spring 1382, and engaging the pushrod may for example be achieved by moving the pivot 1380. The engagement of the pushrod 1378 will tend to cause the transmission to downshift, which is considered desirable and may enable engagement of ratio control mode "on the fly".

Figure 14:
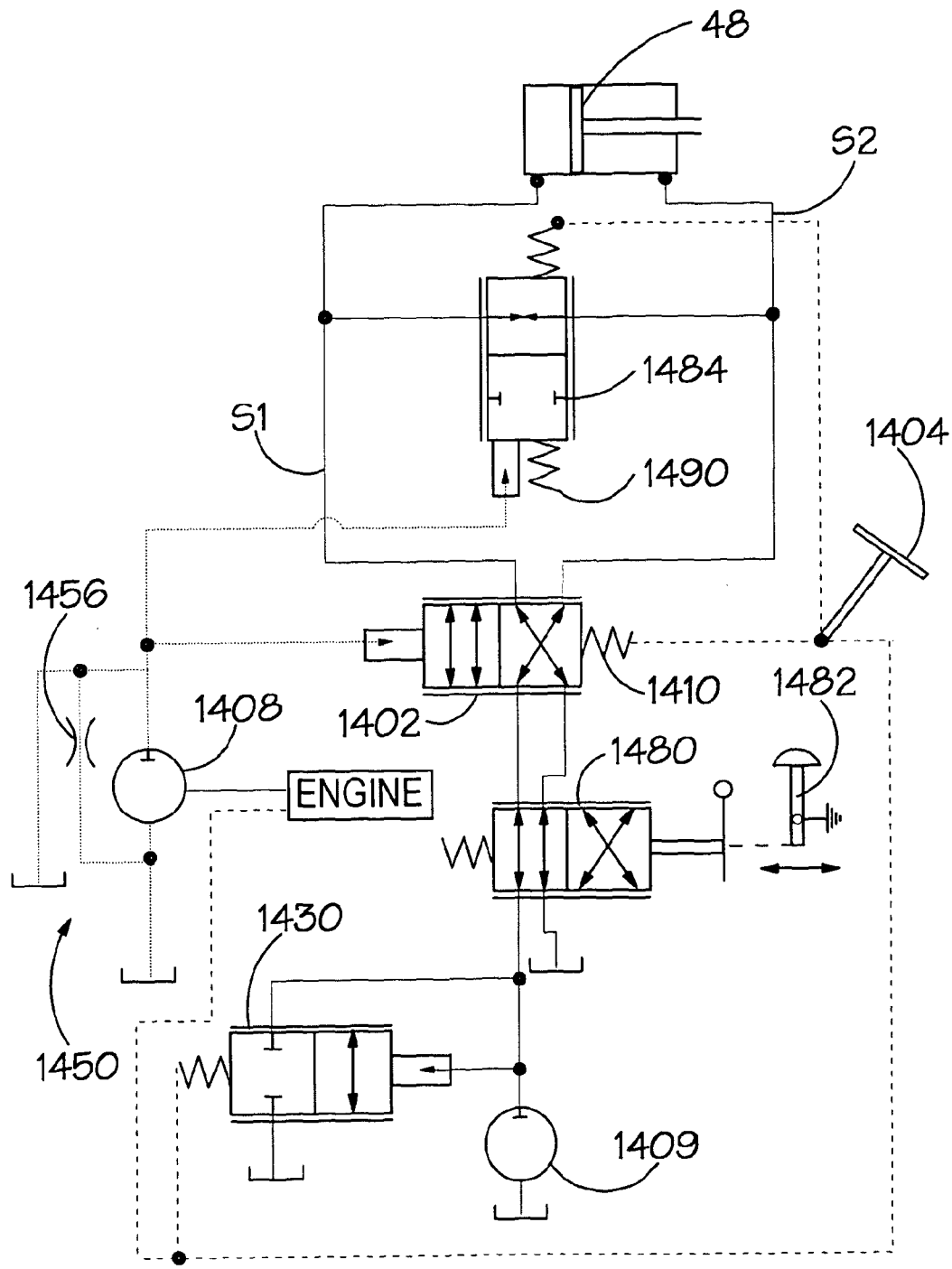
FIG. 14 is a schematic representation of a seventh power train control system embodying the present invention.

FIG. 14 represents another version of the control system, this one having provision for the driver to reverse the direction of torque at the driven wheels, both for driving the vehicle in reverse and for providing engine braking—i.e. to enable the driveline to be used to slow the vehicle.

As in certain previous embodiments, an engine speed sensing system 1450, using a pump 1408 driven from the engine and an orifice 1456, provides a pressure wxhich is a function of engine speed to one side of a pressure control valve 1402. Pedal 1404 exerts a variable force on the opposite side of the pressure control valve 1402 through a spring 1410. As before, the pressure control valve 1402 controls application of pressures to pistons 48 of the variator, the required fluid pressure being created by an arrangement of a pump 1409 and a regulator valve 1430.

The embodiment depicted in FIG. 14 differs from earlier embodiments in having a direction control valve 1480 connected between the pump 1409 and the pressure control valve 1402. The direction control valve 1480 is able to swap the inputs to the pressure control valve 1402, reversing the direction of the force applied by the variator pistons 48 and hence reversing the direction of torque at the driven wheels.

The control systems illustrated herein may be used with transmissions of the type which allow forward drive, reverse drive and "geared neutral" to be provided merely by adjustment of variator ratio. Such transmissions are well known and details are to be found for example in Torotrak's patent applications GB2410302 and WO94/16244. The FIG. 14 control system allows such transmissions to be controlled both in forward and reverse. The driver selects the direction of drive torque at the driven wheels using a control part 1482 (specifically a lever, in the illustrated embodiment) which controls the state of the direction control valve 1480. From a standing start, one position of the control part 1482 will cause the vehicle to travel forwards, the other will cause it to travel backwards. If, for example, the vehicle is travelling forward and the driver selects reverse w heel torque through the control part 1482 then the effect will be to apply reverse torque at the vehicle wheels, causing the vehicle first to slow the vehicle to a halt and then to move backwards.

When, as in the example just described, the transmission is being used to provide "engine braking"—that is, the direction of wheel torque is opposite to the direction of wheel rotations, the previously described control systems may allow engine speed to rise undesirably, since application of pressure to the piston 48 by the control valve 1402 causes engine speed to rise rather than fall. To address this potentially unstable situation during engine braking, an overspeed control valve 1484 serves to set a raised engine speed which is higher than the no load set point of the governor. The overspeed control valve 1484 is similar to the pressure control valve 1402 in that it receives opposed signals representing (1) engine speed—in FIG. 14 it receives the output pressure from the engine speed sensing system 1450—and (2) the position of the driver's control—the pedal 1404, acting through a spring 1486 which converts pedal position to a force signal. The comparison of these two inputs by the overspeed control valve 1484 is weighted by virtue of a spring 1490 acting on the valve's spool. If the engine speed signal dominates (indicating excessive engine speed) then the overspeed control valve 1402 reduces the reaction force of the variator. In the illustrated embodiment this is done by transiently connecting the supply lines S1 and S2 leading to opposite sides of the variator, allowing the pressure difference across variator pistons 48 to reduce. Variator reaction torque is thus also reduced. When the pedal signal dominates (indicating that engine speed is correct or too low) then overspeed control valve 1484 closes.

The effect is to reduce variator reaction torque (and hence wheel torque) if engine speed exceeds the no-load speed by a chosen margin. The system provides the driver with an appropriately rising engine speed with increasing pedal actuation when "shuttling" by use of the control part 1482.

When the engine is driving the wheels (i.e. not providing engine braking) the overspeed control valve 1402 automatically closes and the variator is, as described hereinbefore, controlled by the pressure control valve 1402.

In a transmission that provides "geared neutral"—a condition in which the transmission provides an infinite speed reduction, so that the driven wheels of the vehicle can be brought to a halt without being decoupled from the engine—some provision needs to be made to ensure that excessive wheel torques are not created in response to driver input. At very low transmission ratios, loading the engine sufficiently to slow the engine may create unexpectedly large torque at the vehicle wheels, which could be disconcerting for the driver. In one embodiment, the problem is overcome by linking the output of the speed sensing system (which may be a hydraulic system such as 1450 in FIG. 14 or an electrical system such as 514 in FIG. 5) to the driver control (pedal) 1404. The signal representing engine speed is reduced until the drive moves the control 1404 to clearly indicate a requirement for wheel torque (e.g. until the pedal is depressed 10% of its travel). Zero wheel torque (or alternatively only a small predetermined creep torque) is created at geared neutral until this positive driver input is given.

The invention claimed is:

1. A control system for a vehicle drivetrain having an engine provided with a speed governor and a continuously variable transmission incorporating a variator which is constructed and arranged to regulate variator reaction torque, the control system comprising a control part movable by the driver to provide a driver input, an open loop subsystem for operatively coupling the control part to the governor to control no-load speed of the governor in dependence on the driver input, a closed loop subsystem comprising a comparator which receives a first control signal derived from the driver input and corresponding to a target engine speed, and a second control signal corresponding to engine speed, and which adjusts variator reaction torque in dependence upon a comparison of the first and second control signals causing the transmission to load the engine suitably to achieve the target engine speed.

2. A control system as claimed in claim 1 in which the target engine speed is smaller than the no-load speed.

3. A control system as claimed in claim 2 in which the target engine speed is, for driver inputs above a predetermined threshold, smaller than the no-load engine speed by a margin in the range from 2 to 10 percent of the no-load engine speed.

4. A control system as claimed in claim 1 which further comprises a direction control device for reversing the direction of variator reaction torque to enable the drivetrain to provide engine braking.

5. A control system as claimed in claim 1 which further comprises an overspeed prevention device which prevents excessive engine speed increase during engine braking.

6. A control system as claimed in claim 1 in which, at least while power is being transmitted from the engine to the wheels, the governor loads the engine to a level at or close to its maximum torque and so keeps it operating at high efficiency.

7. A control system as claimed in claim 1 in which the open loop subsystem comprises a physical coupling between the control part and the governor.

8. A control system as claimed in claim 7 in which the said physical coupling comprises a rod linkage or a cable linkage.

9. A control system as claimed in claim 1 in which the first control signal takes the form of a first force applied to the comparator, the system comprising a converter mechanism for converting the position of the control part into the said first force.

10. A control system as claimed in claim 9 in which the said converter mechanism comprises a spring through which the control part is coupled to the comparator.

11. A control system as claimed in claim 1 in which the converter mechanism comprises a converter valve arranged to modulate its own output pressure in accordance with position of the control part.

12. A control system as claimed in claim 1 in which the second control signal also takes the form of a force applied to the comparator, the system comprising a modulation device for modulating the said force in accordance with engine speed.

13. A control system as claimed in claim 12 in which the modulation device comprises a solenoid whose electrical supply is modulated in dependence on engine speed.

14. A control system as claimed in claim 12 in which the modulation device comprises a pump operated by the engine and an arrangement for modulating a hydraulic pressure in accordance with pump flow.

15. A control system as claimed in claim 14 in which the said arrangement for modulating a hydraulic pressure comprises a restrictor in the flow of fluid from the pump, so that a pressure change across the restrictor depends upon the rate of said flow of fluid.

16. A control system as claimed in claim 1 in which the comparator is a mechanical device.

17. A control system as claimed in claim 16 in which the first and second control signals work in opposition on a movable part of the comparator mechanism.

18. A control system as claimed in claim 1 in which the comparator comprises a comparator valve serving to modulate a variator control pressure.

19. A control system as claimed in claim 18 in which the comparator valve has a movable part which is subject to the first and second control signals, working in opposition, and which serves, depending on which of the first and second control signals dominates, to connect the variator either to an exhaust or to a source of pressurised hydraulic fluid.

20. A control system as claimed in claim 1 comprising a regulation device for regulating the rate of change of the first control signal.

* * * * *